Feb. 5, 1935.  A. B. GIBSON  1,990,068
AUTOMATIC WEIGHING MACHINE
Filed Jan. 7, 1933   2 Sheets-Sheet 2
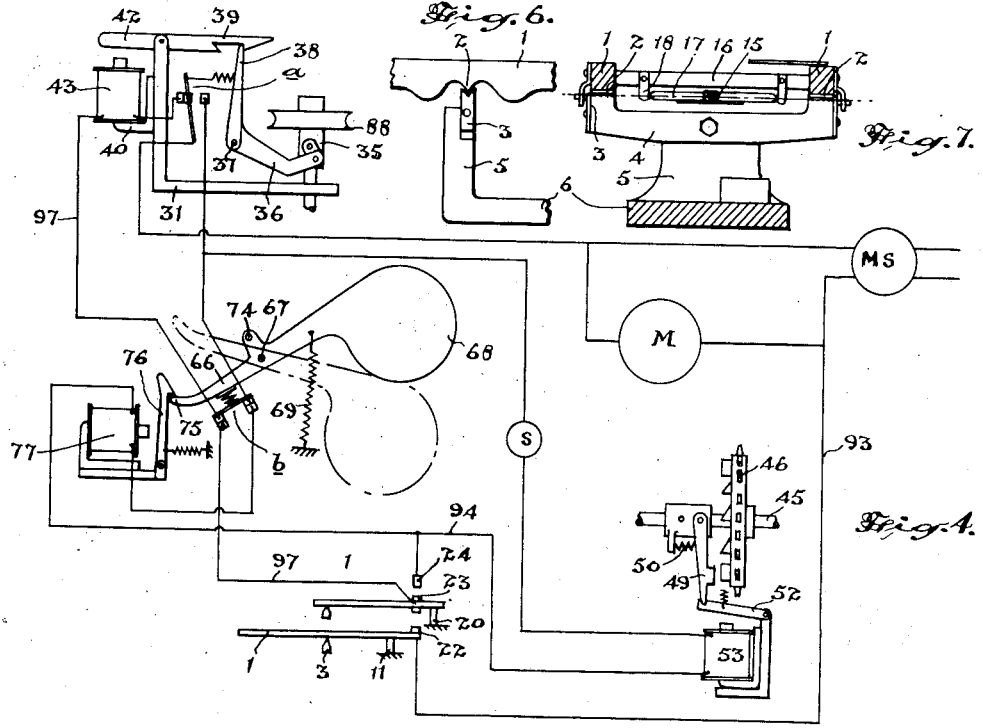
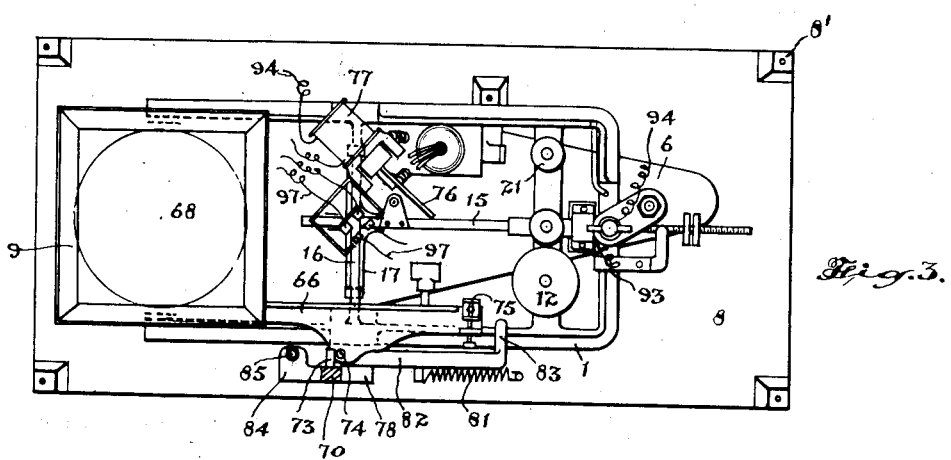
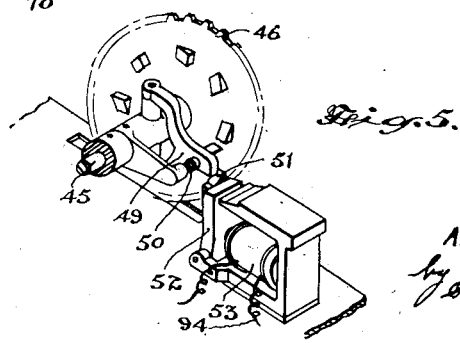
Inventor.
Ansel B. Gibson.

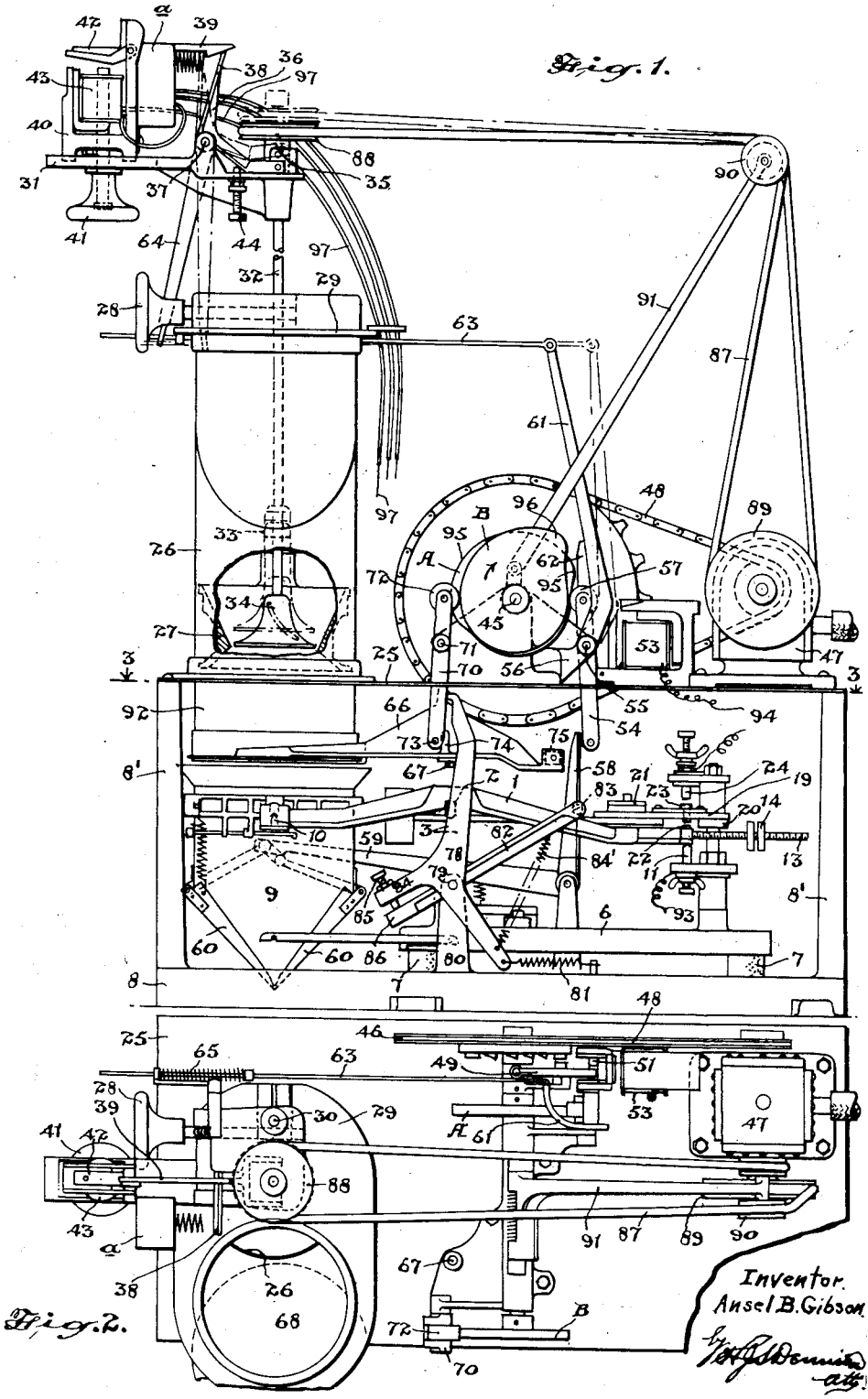

Patented Feb. 5, 1935

1,990,068

UNITED STATES PATENT OFFICE 1,990,068

AUTOMATIC WEIGHING MACHINE

Ansel B. Gibson, Weston, Ontario, Canada

Application January 7, 1933, Serial No. 650,658

10 Claims. (Cl. 249—45)

The principal object of this invention is to provide a weighing machine which will automatically weigh measured quantities of material with extreme accuracy and rapidity and which may be quickly adjusted to the handling of a wide variety of materials.

A further object is to provide a machine which will be reliable in its operation, and of sturdy and simple construction requiring the minimum of attention.

The principal feature of the invention consists in the novel construction and arrangement of parts whereby the material to be weighed is fed in a regulated stream to the weigh pan or bucket of a weigh beam, the movement of which is imparted toward the end of the weighing operation to an auxiliary beam or suspended weight member which is adapted to momentarily arrest the movement of the main beam and to then be raised thereby on the application of the desired weight of material to the main beam, the final shut-off of the stream of material being dependent on the movement of the auxiliary beam or weight.

A further and important feature resides in the novel construction wherein the stream of material flows from an adjustable throat, the cross sectional area of which is automatically reduced by the primary movement of the main beam and whereby a portion of the large flow is accumulated in a pre-measuring chamber until the completion of the preceding weighing operation and is released therefrom as a bulk charge to commence the weighing operation to be then followed by a continued flow from the throat until the desired weight is obtained in the bucket.

A further and important feature consists in the novel manner of controlling the sequential operations of the device electrically by contacts closed progressively and respectively by the movement of the main beam and the secondary beam or weight.

The invention further resides in the novel construction and manner of adjusting the volume of the pre-measuring chamber and in the means for controlling the size of the feed throat.

In the drawings Figure 1 is a side elevational view of a machine constructed in accordance with the present invention.

Figure 2 is a plan view of the machine shown in Figure 1.

Figure 3 is a sectional plan view taken on the line 3—3 of Figure 1.

Figure 4 is a diagrammatic view illustrating the manner in which the operating parts are controlled from the main and secondary beam contacts.

Figure 5 is a perspective detail of the single revolution clutch for imparting motion to the operating parts during each weighing operation and showing the magnetic control therefore.

Figures 6 and 7 are side and end elevational views illustrating the manner in which the main and secondary or auxiliary beams are mounted to pivot on a common axis.

Automatic weighing machines have been in use for many years but many objections are associated in the former structures which the present invention aims to overcome.

In carrying the present invention into effect, in accordance with the form shown in the drawings the main beam 1 is supported substantially midway of its length by the knife edge bearings 2 engaging bearing blocks 3 carried at the ends of a transverse yoke member 4, the latter being suitably secured to a flange portion 5 of the base 6. The base 6 preferably comprises a casting which is suitably mounted on rubber blocks 7 which rest on the base 8 of the main frame, the resilient blocks serving to minimize the transference of shocks or vibration to which the main frame might be subject.

A weighing bucket 9 adapted to receive the material to be weighed is pivotally mounted at one end of the main beam on the knife edge bearings 10 and is closed at the bottom by swinging members which are adapted to be operated at the end of the weighing operation as will hereinafter appear.

The opposite end of the main beam 1 normally rests on the adjustable stop member 11 and is adapted to receive the weights 12 in accordance with the weight of material it is desired to place in the bucket before the main beam is swung on its pivot. The main beam preferably also carries a threaded extension 13 on which weights 14 are threaded to enable minute adjustment of the balance of the beam.

An auxiliary beam 15 is pivotally mounted at one end on a cross member 16 of the main beam, this being effected as shown in Figure 7 by providing the auxiliary beam with lateral pivot extensions 17 which are supported at the ends in the blocks 18 in direct alignment with the knife edge bearings of the main beam.

A shown in Figure 1 the free end of the auxiliary beam carries an insulating extension 19 which is adapted to be engaged by an adjustable stop member 20 to limit the downward movement of the auxiliary beam so that in the normal position of the main beam as shown in Figure 1 the main beam will be free of contact with the free end of the auxiliary beam.

Suitable weights 21 are placed on the free end of the auxiliary beam to vary its effective weight.

Mounted on and insulated from the weight end of the main beam is an electrical contact 22 and a similar electric contact 23 is mounted on the insulating extension 19 of the auxiliary beam directly above the contact 22 to be engaged by the latter after a pre-determined movement of the main beam.

Thus when a sufficient weight of material has been placed in the weigh bucket 9 to raise the opposite end of the beam from its stop 11, the main beam will swing sufficiently to bring the contact 22 into engagement with the auxiliary beam contact 23 so that the swinging movement of the main beam will be momentarily arrested by reason of the additional weight presented by the free end of the auxiliary beam.

When however sufficient additional material has been added to the bucket 9 to off-set the weight of the auxiliary beam the latter will then swing in unison with the main beam and be carried upwardly thereby so that the contact 23 of the auxiliary beam will engage in electrical contact with an adjustable contact member 24 to direct a flow of current to an electrical release device and prevent further flow of material to the weigh bucket 9 as will hereinafter appear.

The main frame is preferably formed with uprights 8' on which is mounted a plate 25 which is spaced above the weigh beam mechanism described.

The material to be fed to the weighing bucket is supplied to the conduit 26 which extends vertically above the weigh bucket 9.

A throat member 27 is slidably mounted within the conduit 26 and is firmly held therein in vertically adjusted positions by means of the hand clamp member 28 which is mounted on the closure plate 29 of the conduit, the clamp element 28 co-operating with a vertical rigid rod extension 30 of the throat member 27 for this purpose.

A bracket member 31 is rigidly mounted on the upper end of the rod extension 30 and has rotatably mounted therein a vertical spindle 32, the spindle being slidable in its bearing and extending downwardly in the feed conduit 26. The lower end of the spindle is guided by a bearing 33 suitably mounted on the throat member 27 and the lower extremity of the spindle has mounted thereon a flared valve member 34 which is preferably in the form of an agitator member.

The spindle is adapted to be raised and lowered periodically during the weighing operation to vary the effective size of the throat member 27, and consequently the rate of flow of the material to be weighed to the weigh bucket in a manner to be hereinafter described.

A thrust collar 35 encircles the spindle 32 above the bracket and the bell crank member 36 pivotally mounted at 37 in the bracket 31 has one arm operatively engaging the thrust collar so that by swinging the bell crank lever in a counter clockwise movement from the position in which it is shown in Figure 1, the upper arm 38 thereof, will be engaged by a pivotal latch member 39 so that the spindle 32 will be moved vertically and held with the valve member 34 spaced above the throat of the member 27.

The latch member 39 is pivotally carried by a block member 40 which is slidably mounted in an extension of the bracket 31 and clamped in adjusted positions by the hand clamp 41. Thus by moving the block 40 toward or away from the pivotal mounting of the bell crank an accurate control of the height at which the latch member 39 will hold the spindle, is provided for. The latch member 39 is adapted to be operated by an armature 42 on the energizing of the magnet 43 as will hereinafter appear so that the spindle is allowed to drop at the desired instant to effect a restriction of the flow of material past the throat 27.

An adjustable stop member 44 is threaded into the bracket 31 and serves to limit the downward movement of the spindle.

A shaft member 45 is mounted transversely above the plate 25 of the frame and has rotatably mounted on one end thereof a suitable toothed clutch member 46 which is constantly driven from a gear reduction unit 47 by means of the chain 48.

Rigidly mounted on the shaft 45 are a pair of cam members A and B which are adapted to be turned through a complete revolution during each weighing operation to control the mechanical operation of the machine.

The clutch is here shown as having a clutching member 49 mounted to swing on a pivot diametrically disposed to the drive shaft 45 so that when it is moved inwardly toward the toothed member 46 by the spring 50, it will be engaged by one of the tooth projections thereof and an operating connection will thus be established between the rotating toothed clutch member and the shaft 45.

As shown in Figure 5 the pivotal clutch member at the end of each revolution is adapted to engage the sloping surface 51 of a pivotal armature 52 so that it is disengaged from the clutch teeth and comes to rest on the upper extremity of the armature.

A magnet 53 co-operates with the armature 52 and is adapted when energized by engagement of the contacts 23 and 24, to swing the armature 52 clear of the clutch member 49 so that it is permitted to move into clutching contact with the toothed clutch member.

The cam members A and B when at rest are in the position shown in Figure 1.

A lever member 54 is pivotally mounted at 55 intermediate of its length in a bracket 56 and has a roller 57 at the upper end engaging the periphery of the cam member A. The lower end of the lever engages an arm 58 of a bell crank lever and the other arm 59 of the latter lever is adapted to operate a pair of closure doors 60 carried by the weigh bucket 9 to open and close the same as determined by the rotation of the cam A.

A lever member 61 pivotally mounted on the pivot 55 is adapted to be engaged by the upper extending portion 62 of the lever 54 during the movement of the latter, the upper end of the lever 61 being operatively connected by a rod 63 with an arm extension 64 of the bell crank member 36 in order to effect the resetting of the latter and the raising of the spindle 32.

A compensating spring connection 65 is interposed between the arm 64 and the operating rod 63 so that the operative connection of these members will not be disturbed by adjustment of the block member 40 and latch 39 on the bracket 31.

A lever member 66 is pivotally mounted in the frame on a vertical pivot 67 to swing transversely of the conduit 26 and this lever carries a disc shut-off member 68 which is adapted to swing in under the lower extremity of the conduit 26 to effect an instantaneous closing thereof, the closing being effected by the spring 69.

A lever member 70 is pivotally mounted in the frame at 71 and carries a roller 72 at the upper end for operative engagement with the cam B. The lower end of the lever 70 has a lateral extension 73 which, as the lever 70 is swung on its pivot by the cam B, engages a lug extension 74 on the lever member 66 and swings the latter on its pivot to carry the disc 68 outwardly clear of the conduit 26.

The free end of the lever 66 carries a lug 75 which, when the lever is swung to its extreme position, is engaged by a pivotal latch in the form of an armature 76 and held thereby until the magnet 77 is energized by engagement of the secondary beam contact 23 with the fixed contact 24.

A lever member 78 is pivotally mounted at 79 in an upward extension 80 of the base 8 and has its upper end operatively engaged by the lower end of the lever 70, so that when the latter is being moved by the cam B to open the bottom of the feed conduit 26, the lever 78 will be swung against the tension of the spring 81 in a clockwise direction, Figure 1.

A lever member 82 is also pivotally mounted on the pivot 79 and has a lateral lug extension 83 at the upper end which is adapted to engage the upper side of the main beam 1, this being affected as shown by means of the tension spring 84' extending between the lower end of the lever 78 and the upper end of the lever 82. The lever 78 carries a lateral extension 84 in which is threaded an adjustable contact member 85, which, when the lever 78 is permitted to return in a counter clock-wise direction to its normal position as shown in Figure 1, engages the end 86 of the lever 82 to swing the latter against the tension of the spring 84' so that the lug extension 83 of the lever 82 will be moved clear of the weigh beam.

The spindle 32 is adapted to be driven at a suitable speed by the belt 87 passing over the pulley 88 and driven from a pulley 89 of the gear reduction unit 47, and idler pulleys 90 carried by a pivotal arm 91, support the belt at a point intermediate of the length thereof in the manner shown in Figure 1 so that the belt will remain tensioned at all times irrespective of the vertical movement imparted to the spindle 32.

Other suitable means however, in place of the arm 91 may be provided.

On reference to Figure 1 it will be noted that the throat member 27 is spaced above the lower end of the conduit 26 under which the disc 68 swings, so that when the disc is in its closed position below the conduit, the space between the disc and the throat member constitutes a measuring chamber 92 so that when the valve member 34 is raised to the dotted line position shown in Figure 1, the material to be weighed will flow through the open throat freely into the measuring chamber to fill the same with a predetermined volume, as determined by the size of the measuring chamber, which may be regulated by the vertical adjustment of the throat member as previously defined.

The operation of the device will now be described with particular reference to the structure shown in Figure 1 and the diagrammatic showing of Figure 4.

Assuming the measuring chamber 92 to be closed at the bottom by the disc 68 and the valve member 34 to be raised and held in the dotted line position by the latch member 39, the measuring chamber then will be filed with the material to be weighed which will flow freely through the throat from the conduit 26. The measuring chamber 92 thus holds a charge of material of definite volume which represents a large or major part of the quantity to be weighed in the bucket 9.

Also assuming that the previously weighed batch or quantity of material is contained in the bucket 9 so that the main beam and auxiliary beam has been overbalanced and contacts 22, 23 and 24 brought into engagement. Electric current is thus permitted to flow from the lead wire 93 through the contacts to the conductor 94 to energize the magnet 53, thus releasing the clutch member 49 by withdrawing the armature 52 away therefrom. The cam shaft 45 is thereby caused to turn in unison with the toothed clutch member 46.

The raised concentric portion 95 of the cam A immediately effects the swinging of the lever 54 on its pivot and acting through the bell crank arms 58 and 59, swings the dump doors 60 of the bucket downwardly and open to discharge the contents of the bucket into a package or receiver that may be placed thereunder.

Concurrently with the swinging of the arm 54, the arm 61 is swung on its pivot to the dotted line position shown in Figure 1 so that the bell crank arm 38 is swung into locking position with the latch 39 so that the measuring chamber 92 may be rapidly filled in the manner previously described.

The rotation of the cams A and B continues for substantially half a revolution at which point the cam portion 96 of the cam B engages with the roller 72 of the lever arm 70 imparting a quick swinging motion thereto so that the lateral extension 73 thereof engages in pressure-operating contact with the lug 64 of the disc lever 66, swinging the same to an open position to discharge the measured contents of the measuring chamber 92 into the bucket 9, the doors of which have previously been allowed to close by disengagement of the roller of lever 54 from the raised concentric portion 95 of the cam A. The lever 66 is swung in this manner sufficiently far to be engaged by the magnetically controlled latch 76 so that it is held thereby.

Concurrently with the swinging of the lever 66 the lever 78 will be swung on its pivot by engagement with the lever 70 so that the contact member 85 moves clear of the end 86 of the lever 82, permitting the spring 84' to pull down on the lever 82 to hold the lateral extension 83 firmly against the main beam 1 so that the weight of the measured charge in striking the bucket 9 will not swing the main beam on its pivot and so that the contacts 22, 23 and 24 will be prevented from coming into contact by the impact of the charge.

After the main charge has passed from the chamber 92 the material continues to flow through the throat member 27 in a substantial stream by reason of the raised position of the valve member 34. Meanwhile the continued rotation of the cam B permits the gradual return of the lever 78 in a counter clock-wise direction under the influence of the spring 81 so that contact 85 effects the gradual raising of the lever extension 83 from the main beam so that it is free to swing when a predetermined weight is received in the bucket 9.

When sufficient material has been added to the bucket 9 by the substantial flow thereof passing the throat 27, the main beam 1 will become unbalanced and contacts 22 and 23 will be engaged. Electric current from wire 93 then passes between contacts 22 and 23 through lead wire 97 to energize magnet 43, thus releasing the engagement of the latch 39 with the bell crank arm 38 and permitting the spindle and valve member 34 to drop to the full line position shown in Figure 1. The flow of material through the throat is thus restricted considerably to a very fine or dribble flow which continues to pour into the bucket 9 through the open measuring chamber 92.

The engagement of the main beam contact with the contact carried by the secondary or auxiliary beam 15 effects the momentary arresting of the main beam by reason of the inertia effect and the additional weight represented by the auxiliary beam.

As the material continues to flow in a very fine stream into the bucket 9, a quantity will be gradually added thereto sufficient to overcome the added weight of the supplementary beam and the two beams will then swing in unison, until the contact 23 engages the contact 24. When this takes place contact 24 will be energized through contacts 22 and 23 and current will be directed to the magnet 77 so that the armature latch 76 will be retracted free of the latch lug 75 permitting the spring to swing the lever 66 and disc 68 to a position to close the lower end of the conduit 26, completely cutting off any further flow of material to the bucket.

Concurrently with the energizing of magnet 77, current will be directed through the common lead wire 94 to the magnet 53 controlling the clutch element 49 which has been previously released during the weighing operation at the end of the single revolution of the cam shaft by engagement with the sloping surface 51 of the armature 52, and a second weighing operation is thus commenced. If desired the energizing of the magnet 53 may be subject to manual control by a suitable switch S interposed in the circuit thereof so that the starting of the second weighing operation may be delayed if desired.

Suitable cut-outs $a$ and $b$ are preferably provided respectively, in conjunction with the elements 38 and 66 so that the current can flow to the magnets 53, 43 and 77 only at the required periods during the operation of the machine as determined by the selective engagement of the contacts 22, 23 and 24.

It will be understood that many variations may be made in the actual structure of the device without departing from the essential spirit of the invention, and while I have provided for the supply of material to the bucket in a graduated manner in three successive stages comprising an initial volume charge of measured proportions, a following rapid flow, and a final restricted flow, whereby rapidity of application of material is combined with sensitive balancing, it may be found desirable in certain cases to omit either the measuring stage, the large flow stage, or the restricted flow stage.

What I claim as my invention is:—

1. In an automatic weighing machine, the combination with a weighing mechanism having a weigh bucket connected with the weighing mechanism, and means for supplying material to be weighed, of a throat member interposed between the supply and the weigh bucket, a constantly rotating valve member movable axially to control the effective size of said throat to regulate the resultant volume of flow therefrom to the bucket, and means for automatically controlling the axial positioning of said valve to vary its relation to the throat during each weighing operation.

2. In an automatic weighing machine, a material supply conduit, a weighing mechanism, a bucket positioned below said conduit and connected with the weighing mechanism, a throat member in said conduit through which the material is adapted to flow to be received by the bucket, a slidable spindle extending into the conduit having a valve member thereon for cooperation with the throat member, means for automatically raising said spindle to alter the relation of the valve member to the throat member whereby a regulation of the volume of material passing through said throat is effected, and means for closing the bottom of said conduit when a predetermined weight of material has been received in said bucket, said spindle valve and throat member being adjustable as a unit, without disturbing their relative flow control adjustment, relative to said closing means to provide a pre-measuring chamber above the latter.

3. In an automatic weighing machine, the combination with means for supplying material to be weighed, and a weigh bucket adapted to receive material from said supply, of means forming a passage between the supply and the bucket through which the material flows, an annular throat in said passage, a constantly rotating valve member slidably mounted and movable toward or clear of said annular throat to open or restrict the passage of the flow of material therethrough, means for constantly rotating said spindle valve, means for automatically sliding the valve member into and out of constricting relation to the annular throat to regulate the volume of flow of material therethrough to the bucket, and means for completely cutting off the flow to the bucket when a predetermined weight of material has been received therein.

4. In an automatic weighing machine a feed conduit, a weighing mechanism having a weigh bucket connected therewith and positioned to receive material from the conduit, a convergent throat member in said feed conduit having a support extension, means co-operating with said support extension to secure the throat in adjusted position, means for opening and closing the bottom of the feed conduit and forming with said adjustable throat member an adjustable measuring chamber above said bucket, a bracket secured to said support extension and movable therewith, a spindle slidably journalled in the bracket and having an agitator valve portion cooperating with the throat, means for raising said spindle to enlarge the throat, latch means carried by the bracket for retaining the spindle in its raised position, means for rotating said spindle, and means controlled by the movement of the bucket for controlling the operation of said opening and closing means and the release of said latch means.

5. In an automatic weighing machine the combination with means for supplying material to be weighed, of a main weigh beam having a bucket to receive material from the supply, an auxiliary weight beam acting as an inertia body to oppose the movement of the main beam after a predetermined movement of the latter in the weighing operation, electric contacts rigid with said main and auxilary beams, and acting in the dual capacity of rigid non-springing impact surfaces and electric conductors between said respective beams, and means controlled by said main and auxiliary beam contacts for effecting a graduated control of the volume of material flowing from the supply to the bucket, said main and auxiliary beams having their respective pivots disposed in true axial alignment to avoid frictional contact between the respective beam contacts to preserve the maximum accuracy of balance.

6. In an automatic weighing machine the combination of means for supplying material to be weighed, a main pivotally mounted weigh beam having a bucket to receive material from the supply, spaced pivot blocks rigidly secured to said main beam at its pivot mounting and movable therewith, an auxiliary beam adapted to be moved by the main beam after a predetermined movement of the latter, said auxiliary beam being pivotally mounted on said spaced main beam blocks in pivotal alignment with the pivotal axis of the main beam whereby the weight transmitted through the auxiliary beam pivots is carried by the main beam pivots and whereby said respective beams are adapted to swing in unison on the main beam pivot after said predetermined movement of the main beam, electric contacts rigid with the respective beams and forming rigid non-springing impact surfaces therebetween, a third electric contact energized on movement of said auxiliary beam, and means controlled by the progressive engagement of said contacts for effecting a graduated control of the volume of material flowing from the supply to the bucket.

7. In a weighing machine, the combination with a weighing mechanism, a passage for conducting material to be weighed to the weighing mechanism, of a tapered throat member interposed in said passage between the supply and the weighing mechanism and having its inner surface converging downwardly to a central opening, a constantly rotating circular valve movable axially during the weighing operation in a direction axially of said throat member whereby it forms with the convergent walls thereof a passage of variable size to progressively restrict the flow of material through the throat opening, means for controlling the axial movement of said valve during the weighing operation, and means for resetting said valve following the weighing operation.

8. A weighing machine as claimed in claim 7 in which the convergent walls of the throat member form a feed duct of substantial inverted conical form and said valve is of substantially conical form.

9. In a weighing machine the combination with means for supplying of material to be weighed and the weighing mechanism, of a measuring chamber interposed between the supply and weighing mechanism, a movable throat member forming an adjustable upper end of said measuring chamber through which the material is adapted to flow to fill said chamber, a rotating valve member slidably mounted for movement to or from said throat member to vary the effective size of the throat, and means for holding said throat member in adjusted positions to determine the size of said measuring chamber, said latter means forming a support for said rotating valve whereby the rotating valve and throat member are moved in unison on the adjustment of the throat member.

10. In an automatic weighing machine, the combination with a weighing mechanism, means for supplying material to be weighed, and an outlet from the supply to the weighing mechanism, of a rotating valve member movable axially to enlarge or reduce the size of the outlet to control the flow of material therethrough, means for holding said valve in open position for a predetermined period to enlarge the outlet and permit a rapid flow of material therethrough, and means controlled by the weighing mechanism for automatically effecting an instantaneous closing movement of said valve to instantaneously reduce the size of the outlet and restrict the flow of material therethrough.

ANSEL B. GIBSON.